(12) United States Patent
Bernon-Enjalbert et al.

(10) Patent No.: US 9,638,744 B2
(45) Date of Patent: May 2, 2017

(54) INTEGRATED CIRCUIT DEVICE, SAFETY CIRCUIT, SAFETY-CRITICAL SYSTEM AND METHOD OF MANUFACTURING AN INTEGRATED CIRCUIT DEVICE

(75) Inventors: Valérie Bernon-Enjalbert, Fonsorbes (FR); Guillaume Founaud, St Orens de Gameville (FR); Yuan Gao, Cugnaux (FR); Philippe Givelin, Leguevin (FR)

(73) Assignee: NXP USA, Inc., Austin, TX (US)

( * ) Notice: Subject to any disclaimer, the term of this patent is extended or adjusted under 35 U.S.C. 154(b) by 43 days.

(21) Appl. No.: 14/409,486

(22) PCT Filed: Jul. 2, 2012

(86) PCT No.: PCT/IB2012/002539
§ 371 (c)(1),
(2), (4) Date: Dec. 19, 2014

(87) PCT Pub. No.: WO2014/006442
PCT Pub. Date: Jan. 9, 2014

(65) Prior Publication Data
US 2015/0331040 A1   Nov. 19, 2015

(51) Int. Cl.
*G01R 31/28* (2006.01)
*H01L 21/762* (2006.01)
*H01L 21/22* (2006.01)
*H01L 29/06* (2006.01)
*G01R 31/3187* (2006.01)
(Continued)

(52) U.S. Cl.
CPC ..... *G01R 31/2851* (2013.01); *G01R 31/3177* (2013.01); *G01R 31/3187* (2013.01); *G06F 17/5045* (2013.01); *H01L 21/22* (2013.01); *H01L 21/76224* (2013.01);
(Continued)

(58) Field of Classification Search
CPC   G01R 31/26; G01R 31/3177; G01R 31/3187; G06F 17/5045
See application file for complete search history.

(56) References Cited

U.S. PATENT DOCUMENTS 5,745,670 A   4/1998  Linde
6,524,873 B1 * 2/2003  Satya .................... G01N 21/66
                                                                      438/18
(Continued)

OTHER PUBLICATIONS

International Search Report and Written Opinion correlating to PCT/IB2012/002539 dated May 15, 2013.

*Primary Examiner* — Jermele M Hollington
*Assistant Examiner* — Feba Pothen
(74) *Attorney, Agent, or Firm* — Charlene R. Jacobsen (57) ABSTRACT

An integrated circuit device comprises a first integrated circuit and a second integrated circuit wherein the first and second integrated circuits are comprised on a single semiconductor die. The second integrated circuit is a safety circuit arranged to monitor the operation of the first integrated circuit, report any detected faults and drive the device into a failsafe state if a fault is detected. The first integrated circuit may be a power management module for a safety critical system. An isolation barrier in the form of a trench is formed between the two integrated circuits so that the safety circuit is protected from any high voltage or thermal stresses arising in the first integrated circuit. The device has particular application to automotive safety-critical systems such as electric power steering systems.

14 Claims, 3 Drawing Sheets

(51) Int. Cl.
 *G01R 31/3177* (2006.01)
 *G06F 17/50* (2006.01)
 *H01L 27/02* (2006.01)
(52) U.S. Cl.
 CPC ...... H01L 29/0642 (2013.01); H01L 29/0649 (2013.01); *G06F 2217/70* (2013.01); *H01L 27/0207* (2013.01)

(56) References Cited

U.S. PATENT DOCUMENTS

| | | |
|---|---|---|
| 6,765,391 B2 | 7/2004 | Corkum et al. |
| 7,408,381 B1* | 8/2008 | Drimer ............... G06F 17/5054 326/38 |
| 7,952,488 B1 | 5/2011 | Zansky et al. |
| 2004/0119118 A1 | 6/2004 | Williams et al. |
| 2005/0145945 A1* | 7/2005 | Zdebel ................ H01L 27/0255 257/355 |
| 2005/0289489 A1* | 12/2005 | Kim .................... H02J 13/0003 702/182 |
| 2007/0268059 A1 | 11/2007 | Sakaguchi et al. |
| 2008/0191728 A1* | 8/2008 | Attalla ............... G01R 31/2884 324/750.3 |
| 2009/0206377 A1* | 8/2009 | Swain ................ H01L 27/1463 257/292 |
| 2010/0254058 A1 | 10/2010 | Kirchbaum et al. |
| 2012/0008242 A1 | 1/2012 | Salcedo |

* cited by examiner

INTEGRATED CIRCUIT DEVICE, SAFETY CIRCUIT, SAFETY-CRITICAL SYSTEM AND METHOD OF MANUFACTURING AN INTEGRATED CIRCUIT DEVICE

FIELD OF THE INVENTION

This invention relates to an integrated circuit device, a safety-critical system and a method of manufacturing an integrated circuit device.

BACKGROUND OF THE INVENTION

Integrated circuit devices, in general, may comprise multiple circuit arrangements (or "modules") on a common "chip." Such devices, sometimes known as "system on chip" devices or "machines" can include a processor, bus interfaces, memory devices and one or more system buses for communicating information to and from the device or machine. Such integrated circuit devices (or machines) can be found in automotive applications, for example, for engine management, transmission control, control of braking systems and electrical power regulation and control.

Some applications of these integrated circuit devices can be in safety critical systems such as electric power steering and anti-lock braking systems. Any fault which occurs in the integrated circuit device which controls components of a safety critical system could lead to a dangerous situation. For example, a loss of electrical power to an electric power steering system could result in injury to the driver or another person. Safety critical systems such as may be found in automotive systems may not be inherently fault-tolerant. In such cases, additional safety circuitry may be employed by these systems which, in the event of failure such as a loss of electrical power for example, respond in a way that minimises damage to the system or harm to the user. Such safety circuits may in themselves be system on chip devices, sometimes called "failsafe circuits" or "failsafe machines" comprising various functional circuits or modules such as monitoring circuitry, fault detection circuits and fault reporting circuitry. Typically, they may generate an output which may be used to disconnect the monitored device in which a fault has developed and been detected by the safety circuit. It may also, in the event of a power failure being detected, for example, switch in an alternative back-up power supply.

In order to specify functional safety of automotive systems, standards are identified by standardisation organisations. One such standard is the ISO 26262 which defines safety levels, the highest safety level being ASIL-D (Automotive Safety Integrity Level D). For safety applications targeting this level, the safety functions must be ensured even in the case of complete power supply failure.

One known fault tolerant power supply system is described in U.S. Pat. No. 5,745,670. This known system achieves a fault tolerance of an electrical system against power supply failure by providing power from two power sources by two redundant power supply connections to a local power supply and a power distribution bus. Control logic switches in power from the distribution bus if it detects a failure of the local power supply.

SUMMARY OF THE INVENTION

The present invention provides an integrated circuit device, a safety circuit, a safety-critical system and a method of manufacturing an integrated circuit device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to the accompanying drawings. Because the illustrated embodiments of the present invention may for the most part, be implemented using electronic components and circuits known to those skilled in the art, details will not be explained in any greater extent than considered necessary for the understanding and appreciation of the underlying concepts of the present invention and in order not to obfuscate or distract from the teachings of the present invention.

Figure 1:
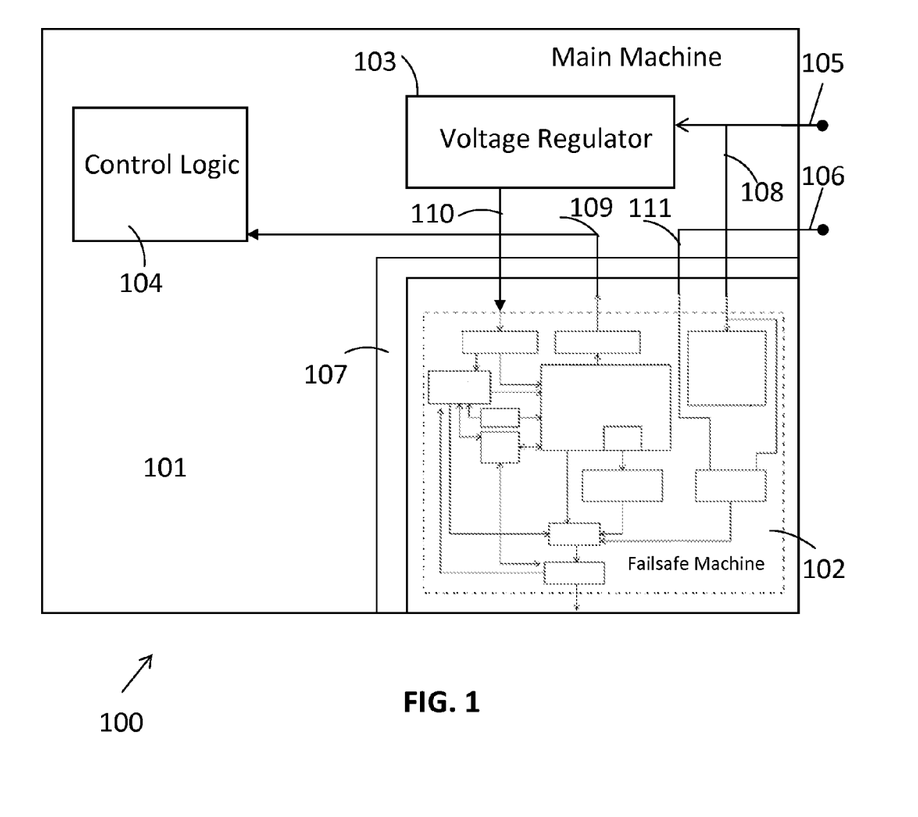
FIG. 1 shows a simplified block diagram of an example of an integrated circuit device comprising a safety circuit.

Referring to FIG. 1, there is illustrated a simplified block diagram of an example of an integrated circuit device 100. It comprises two integrated circuits 101 and 102 which, in the figure are labelled "main machine" and "failsafe machine." The "main machine" is an integrated circuit device of the "system on chip" type which performs a particular function and, can comprise a multiplicity of circuits. In this example, the main machine 101 is a power management module suitable for use in an automotive safety critical system such as an electric power steering system, and which can for example control the power provided to a microcontroller or other microprocessor used in such a system. The power management function of the main machine 101 can e.g. be a conventional and its function and constituent circuits will not be described herein in great detail. Only a voltage regulator 103 and a control logic module 104 are shown in FIG. 1 for the sake of clarity. The voltage regulator may be any type of voltage regulator suitable for the specific implementation and can e.g. comprise linear regulators and DC to DC converters.

The integrated circuit device 100 also comprises external pin connections. Two of these are shown in FIG. 1. These are a main voltage supply pin 105 and a backup power supply pin 106. In this example, where it is envisaged that the integrated circuit device 100 will be used to manage electrical power supplied to an electric power steering system in a vehicle, the main voltage supply pin 105 may be connected to a vehicle's main battery. The backup power supply pin 106 may be connected to an auxiliary battery located in the vehicle.

The second integrated circuit which comprises the integrated circuit device 100 of FIG. 1, is a safety circuit 102 which is labelled in FIG. 1 and referred to in the below as a "failsafe machine". The purpose of this safety circuit 102 is to monitor the main machine 101, detect any faults in the operation of the main machine 101, detect any failure of the main voltage supply, report detected faults and generate control signals which may be used to put an associated safety critical system (eg. automotive electrical power steering system) in a failsafe condition. The failsafe machine 102 is also an integrated circuit of the "system on chip" type which comprises a multiplicity of circuits and modules which will be described in more detail herebelow.

Both main machine 101 and failsafe machine 102 are formed on the same semiconductor die 100 comprising the integrated circuit device of FIG. 1. The die may be a silicon die. The main machine 101 and failsafe machine 102 are isolated from one another by an isolation barrier 107. The isolation barrier may be any type of isolation barrier suitable to inhibit a transfer of perturbations of the main machine 101 to the failsafe machine 102. In an example, the isolation barrier 107 may be in the form of a trench, being an oxide barrier built into the silicon of the integrated circuit device 100. Alternatively in another example, the isolation barrier 107 may comprise rings of opposite doping profiles, e.g. diffusions of different types of dopant into the substrate of the silicon die. The trench or rings isolate, electrically and thermally, as much as possible, the failsafe machine 102 from the main machine 101.

The failsafe machine 102 may be implemented as a single logic circuit located in a specific area of the die 100. The region of the semiconductor die occupied by the failsafe machine 102 may be chosen to be as far removed as possible on the die from the areas in the first region which in operation are at a high voltage or high temperature. This minimises the risk of high stress propagation to the failsafe machine 102.

The electrical signal connections between the failsafe machine 102 and the main machine 101, which the failsafe machine 102 is monitoring, may be implemented with metallization over the silicon, e.g. metal paths which bridge the isolation barrier 107 between the two machines 101 102. In FIG. 1 four such connections are shown, however it will be apparent that any other suitable number of connections may be present. A first connection 108 allows to supply the main voltage from pin 105 to the failsafe machine 102. A second connection 109 allows to take a signal from the failsafe machine 102 to the control logic module 104 in the main machine 101. A third connection 110 allows to take an output from the voltage regulator 103 of the main machine 101 to the failsafe machine 102. A fourth connection 111 may connect a supply loss detector module (comprised in the failsafe machine and to be described in detail herebelow) with the backup power supply pin 106. Other connections, such as ground connections (not shown) to the main machine 101 and the failsafe machine 102 from an appropriate external pin (not shown), may be present.

A safety circuit function within the same device as the functional module that is being monitored by the safety circuit allows a more compact yet less complex system.

Figure 2:
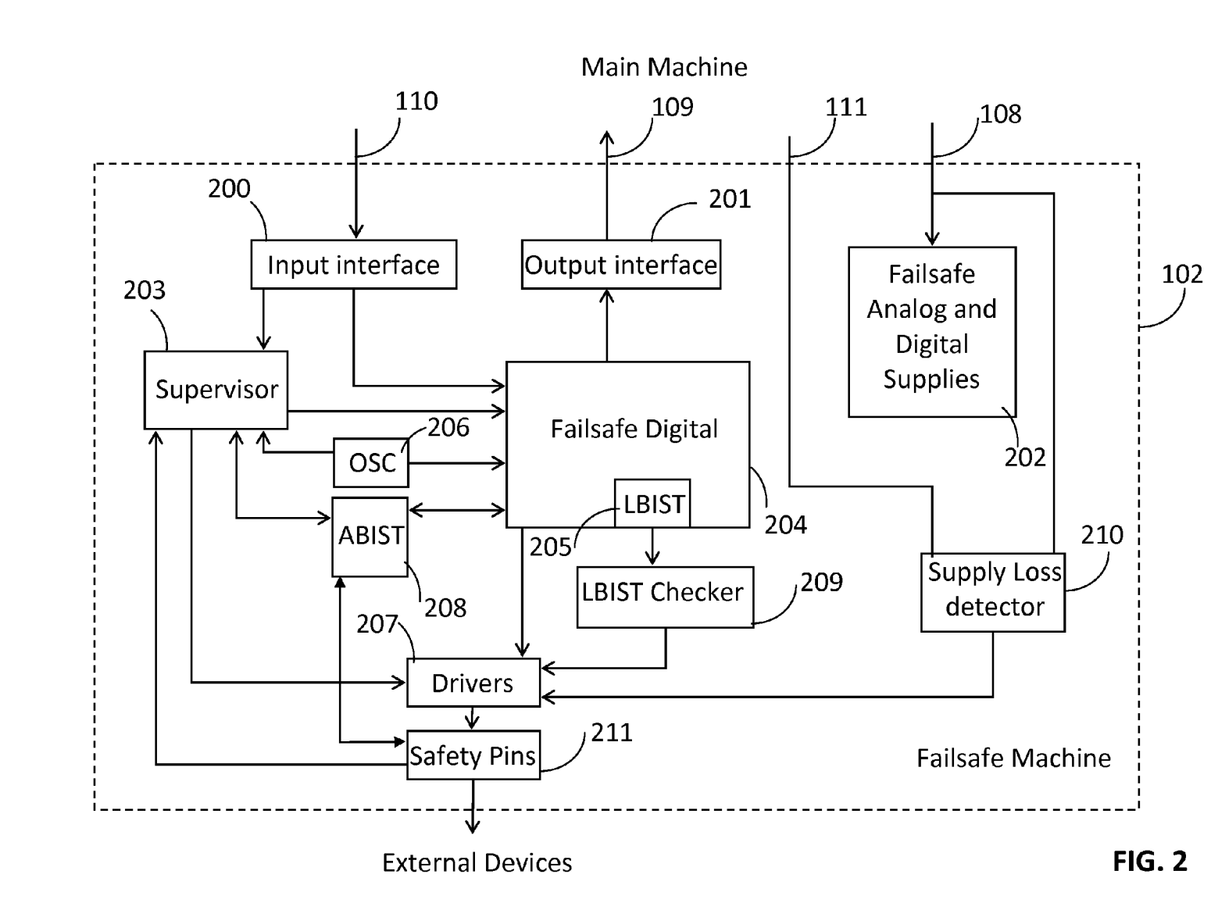
FIG. 2 shows a simplified block diagram of an example of a safety circuit.

A safety circuit will now be described with reference to FIG. 2 which shows the failsafe machine 102 of FIG. 1 in greater detail. The fail safe circuit illustrated in FIG. 2 is just one example of circuitry which may be employed for monitoring the operation of the main machine 101 and detecting faults. It will be appreciated by those skilled in the art that one or more of the various modules described and illustrated in FIG. 2 may be omitted or supplemented or combined with other modules or each other, without degrading the basic functionality of the circuit as a whole.

In this example, the main machine 101 and the failsafe machine 102 are operably coupled through the aforementioned connections 109,110. The failsafe machine 102 comprises way of an input interface 200 and an output interface 201, connected to the connections 110,109 respectively. The input interface 200 and the output interface 201 may comprise conventional clamp circuitry (not shown), e.g. comprising a resistor and Zener diode. Each of the connections passing between the main machine 101 and the failsafe machine 102 may be connected to an individual clamp circuit. These clamp circuits serve as (current limiting) overvoltage protection for signals exchanged between the main machine 101 and the failsafe machine 102. The purpose of these clamp circuits is to avoid overstress being propagated into the failsafe machine. This ensures that the monitoring operation of the failsafe machine 102 is not impaired. Overvoltage can for example occur on failure of circuitry in the main machine 101; for example, if a connection to a voltage supply pin fails and creates a short between a low voltage signal and a high voltage node.

In the shown example, the failsafe machine 102 comprises a failsafe analog and digital supplies module 202 arranged to receive a voltage from the main voltage supply pin 105 via the connection 108 and ensures that the necessary electrical power is supplied to the other various analog and digital functional modules of the failsafe machine 102 in order for them to function correctly. This supplies module 202 receives a voltage directly from an external source rather than from the voltage regulator of the main machine 101, thereby the failsafe machine 102 is ensured independent operation. This measure removes the so-called "common cause failures."

In the shown example, the failsafe machine 102 comprises a supervisor module 203 which functions as a fault detection module and may operate in a conventional manner. The supervisor module 203 is operably coupled to the main machine 101 via the input interface 200, connection 110 and subsequently to the voltage regulator 103 inside the main machine 101. As an example, the supervisor module 203 may monitor analog voltages from the output of the voltage regulator 103 and look for any variation in these voltages which could be sufficient to flag up as a fault. Variations in voltages from the voltage regulator 103 may include overvoltage, under voltage or spikes.

In FIG. 2, a failsafe digital module 204 is shown, operably coupled to the supervisor module 203 arranged to perform the diagnosis and management of any faults which have been detected by the supervisor module 203 to which it is operably coupled. It may perform further, conventional fault management operations such as protocol checks. The failsafe digital module 204 may also be configured to generate a fault reporting signal which may be conveyed to the control logic 104 in the main machine 101 via the output interface 201 and the connection 109. It may also receive, via the input interface 200, digital voltage signals from the voltage regulator 103 of the main machine 101 for monitoring.

In the shown example, a logic built in self test module, LBIST, 205 is embedded within the failsafe digital module 204 which is arranged to perform a self-test of the failsafe digital module 204. The LBIST 205 may be implemented in any manner suitable for the specific implementation and operate to check the operation of the failsafe digital module 204.

As shown, the machine 102 may comprise an LBIST checker module 209 operably coupled to the LBIST module 205 which may be used for "latent fault" detection. Using a LBIST checker module 209 removes the requirement for redundancy or dual implementation of the LBIST module 205 and failsafe digital module 204.

A latent fault is a fault that has occurred but has not yet compromised any related subsystem. In this example, the LBIST checker 209 is used to detect latent faults in the failsafe digital module 204. It may be arranged to perform an extended cyclic check of the failsafe digital monitoring operations performed by the failsafe digital module 204 in order to detect any latent faults in the failsafe digital module 204.

The LBIST checker 209 may also be arranged to verify the validity of any status flags that might be generated by the LBIST module 205 by monitoring the logical states of the flags. The LBIST checker module 209 is embodied in a module separate from the LBIST module 205 so that no resources are shared, meaning that the risk of common cause failures is removed. To further reduce this risk, the LBIST checker module 209 may be made fully asynchronous to avoid the need for using a (common) clock signal. As a further precaution, the LBIST checker module 209 may be supplied by an independent voltage regulator (not shown) allowing it to use a different and more robust transistor structure compared with the devices under test, in this case the failsafe digital module 204 and the LBIST 205.

The LBIST module 205 may for instance generate two status flags, and a valid status flag toggling sequence provided by the LBIST module 205 may then be defined as follows: (i) both flags must be set to their default state at power-on/reset and kept in those states until the built in self test operation is complete; (ii) the "pass" flag must toggle first to indicate that the built in self test check has been completed successfully; eg. no errors have been detected in the failsafe digital module 204; (in case of failure this flag will not toggle); (iii) after a predetermined and fixed delay the "done" flag must toggle in order to indicate the completion of the built in self test operation. Any other behaviour of the two status flags will be considered is as a failure in the built in self test operation. The LBIST checker module 209 may be arranged to check the start-up state of both flags eg. (i) detect if either flag is stuck in an incorrect state; (ii) check that the flags are not shorted together (by detecting if the flags toggle simultaneously); (iii) check that neither flag is shorted individually; (iv) check the correct flag toggling sequence eg. by detecting if the "pass" flag toggles before the "done" flag within a prescribed time period. A delay line may be used on the pass flag internal path in order to detect a short between the two flags.

The LBIST checker functionality may be realised using a simple arrangement of three latch elements (not shown) cascaded and combined together. The three latch elements must be toggled to a logical "1" one after the other in order to set the LBIST checker output to its active state. A first latch is set if both status flags are set to their default state. Then a second latch is set if the first latch is set and the "pass" flag is set after a delay but the done flag has not yet set. Finally, a third latch is set if the two previous latches plus the "pass" and "done flag" are set.

An oscillator circuit module 206, independent of any clock function that may be provided in the main machine 101, provides a clock signal for the failsafe digital module 204 and is also operably coupled to the supervisor 203. The oscillator module 206 may comprise a conventional oscillator circuit. Providing the failsafe machine with its own oscillator allows to removes common cause failures. The oscillator module 206 may be monitored for faults by the supervisor module 203. The supervisor module 203 may be arranged to detect faults in the oscillator, such faults comprising, for example too low or too high a clock frequency or a failure to produce any clock signal. Clock faults can be critical for the operation of an integrated circuit and can prevent the execution of a safety function or may deactivate diagnostic functions. Further, too low a clock frequency will violate the relevant safety time for which a device should be put in a failsafe state. Hence the independent, autonomously-monitored oscillator module 206 of this example mitigates the above-mentioned problems.

A driver module 207 comprising output drivers is operably coupled with the failsafe digital module 204, the supervisor module 203, the LBIST checker and a supply loss detector 210. The operation of this driver circuit module 207 will be described herebelow.

An analog built in test module, ABIST, 208 is also provided in this example of a safety circuit. The ABIST may be arranged to function in a conventional manner in order to check the operation of the supervisor module 203 to which it is operably coupled. It may further be configured to perform an extended cyclic check of the failsafe analog monitoring operation performed by the supervisor module 203. In order to detect any latent faults in the supervisor module 203.

A supply loss detector module 210 may also form a part of the safety circuit of FIG. 2. This module 202 may be configured to detect at least a degradation, if not a total loss of the power which is being supplied to the integrated circuit 100 via the pin 105. This power may be provided by a vehicle's battery in an automotive application. A connection is made from the voltage supply pin 105 to the supply loss detector module 210 via the connection 108 provided between the main machine 101 and the failsafe machine 102. The supply loss detector module 210 may also be supplied with power from a secondary backup voltage source via the pin 106 and connection 111. This backup voltage may for example be provided by an auxiliary battery located in the vehicle or other secondary power source.

The supply loss detector module 210 may be arranged to monitor the magnitude of the voltage being supplied to the integrated circuit device 100 via the pin 105 and detect if the voltage has dropped below a threshold value so as to compromise the safety of the safety critical system of which the integrated circuit device 100 may form a part. Should the main voltage supply drop below the threshold, then the supply loss detector module 210 may draw power from the auxiliary power source via pin 106 in order to generate a fault signal which it provides to the driver circuit module 207. A drop in or loss of supply voltage could arise due to faulty operation of the power source, such as a battery of a vehicle. Alternatively, loss of supply voltage could be caused by a fault in the connection between the integrated circuit device 100 and the power source, for example a pin lift or a bonding disconnection on the integrated circuit device 100.

The failsafe machine may output a error signal when a fault in said operation is detected. For example, on receiving the fault signal from the supply loss detector 210, the driver circuit module 207 may drive one of several safety pins, (schematically represented in FIG. 2 by the modular block 211) to a particular voltage level, which could be a logical "1" or "0" for example. These safety pins 211 comprise output terminals of the integrated circuit device 100. A safety pin may be driven by the driver circuit module 207 into a failsafe state. A safety pin may, for example, be connected to a control unit or some other external device which is arranged to switch a safety critical system into a safety mode so that damage to an associated system or harm to an associated user of the system is minimised. For example, such an external control unit may be a switching circuit arranged to switch on or off the connection between the safety critical system and its power source. In one example, the safety critical system may be an electric steering system and the power source may be the vehicle's battery.

A safety pin 211 may also be activated by the failsafe digital module 204. For example, if the failsafe digital module 204 detects a fault (which it may report to the main machine's logic module 104) it may also send a signal to the driver circuit module 207. In response the driver circuit module 207 may activate one of the safety pins which may be, in turn, connected to an external device for setting an associated safety critical system in a failsafe state.

A safety pin 211 may also be activated by the supervisor module 203 via the driver circuit module 207. For example, the supervisor module 203 may decide that oscillator module 206 performance or variations in the output of the voltage regulator 103 are such that they constitute a fault condition which warrants putting an associated safety critical system in a failsafe state.

A safety pin 211 may also be activated, via the driver circuit module, 207 by an output from the LBIST checker module 209 should the LBIST checker module 209 be unable to verify the validity of the status flags of the LBIST 205.

The ABIST module 208 may activate the safety pins directly if it detects any faults in the circuits that it is monitoring; for example, the supervisor module 203.

The integrity of the safety pins 211 may be monitored by the supervisor module 203. Faults which may develop in the safety pins and which may be detected by the supervisor module 203 include open or short-circuits.

Figure 3:
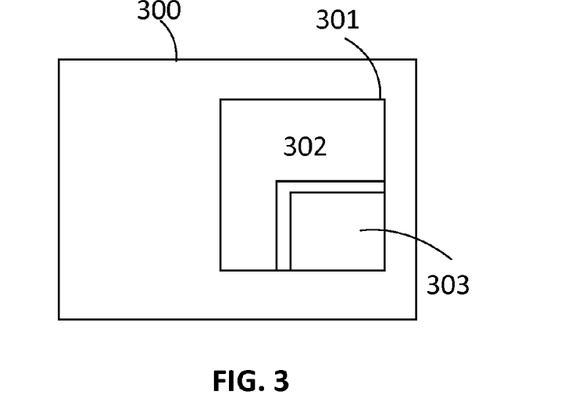
FIG. 3 shows a simplified block diagram of a safety-critical system comprising the integrated circuit device of FIG. 1.

Referring now to FIG. 3, an example of an embodiment of a safety critical system 300 comprises an integrated circuit device 301. Examples of safety critical systems in the automotive field are airbag systems, immobilizers, anti-lock braking systems, electric power steering systems and transmission control systems. In this example, the safety critical system 300 is an electric power steering system. The integrated circuit device 301 comprises a main machine 302, which performs the function of a power management module, and a safety circuit 303. The main machine 302 and the safety circuit 303 may operate in the same fashion as the main machine 101 and the failsafe machine 102 as described above with reference to FIGS. 1 and 2.

In this example, the power management module 302 supplies regulated power to electric power steering actuators (not shown) while the safety circuit 303 monitors the operation of the power management module and the voltage supplied thereto from a vehicle's battery (not shown). If a fault in the power management module 302 is detected by the safety circuit 303 then safety pins, comprised in the safety circuit 303, are driven to the fail safe state. This may result in the electric steering system 300 being forced to perform a graceful shutdown of its operation. An alternative result may be the disconnection of the electric power steering actuators from their controlling power supply. These measures minimise any damage to the components of the electric power steering system or risk of injury to the driver of the vehicle The safety critical system 300 may be in compliance with ISO 26262 functional safety standard. For example, the safety critical system 300 may comply with Automotive Safety Integrity Level D (ASIL-D), this being the highest level of functional safety defined in ISO 26262.

Figure 4:
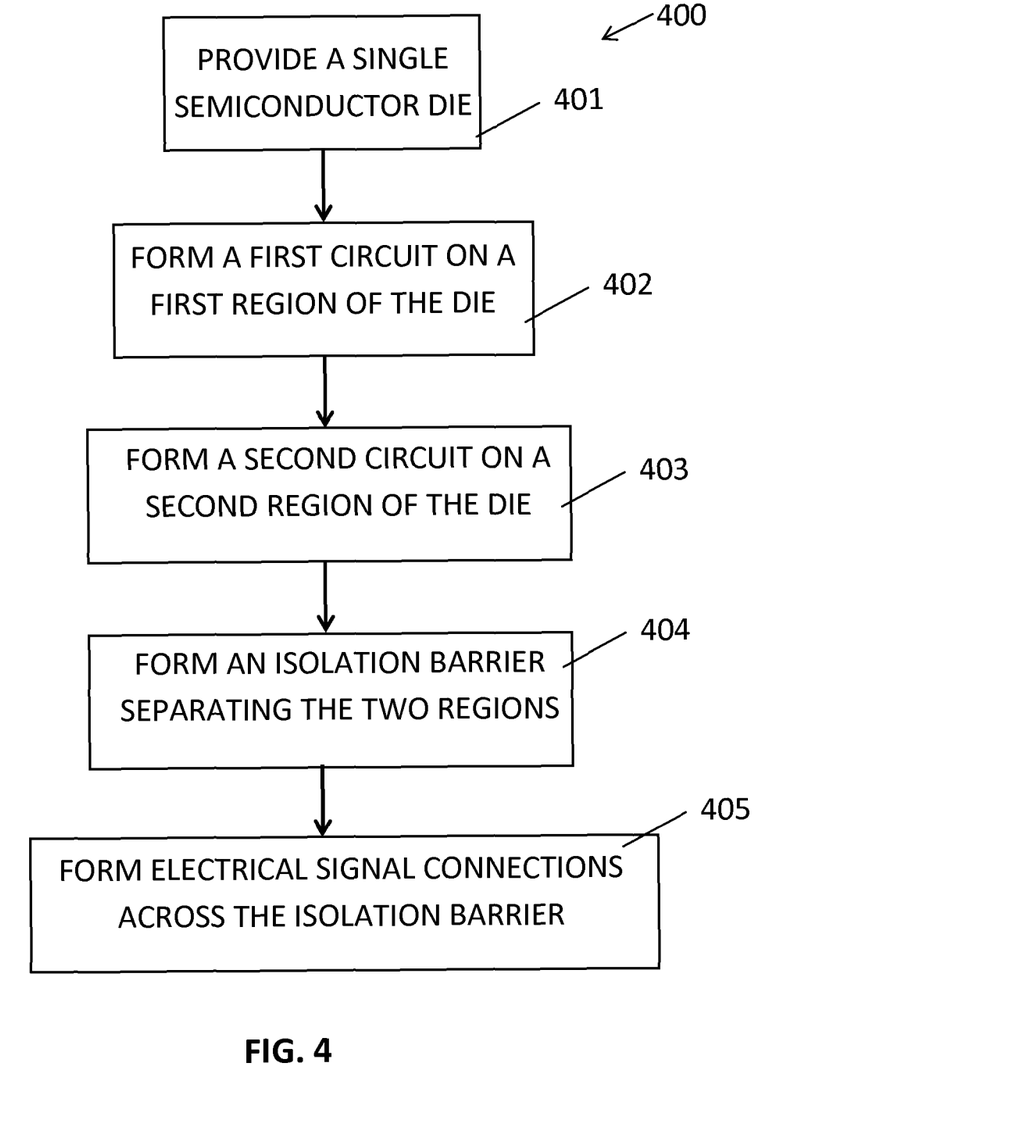
FIG. 4 shows a simplified flowchart of an example of a method of manufacturing an integrated circuit device.

Referring now to FIG. 4, there is illustrated a simplified flowchart 400 of an example of a method of manufacturing an integrated circuit device such as the integrated circuit device described with reference to FIG. 1. The flowchart illustrates five steps 401-405. Those skilled in the art will appreciate that the steps need not necessarily be carried out in the order that they are presented in the flowchart. Furthermore, the techniques employed in carrying out the steps are well known and therefore will not be described in any detail. At step 401, a single semiconductor die is provided. At step 402 a first circuit is formed on a first region of the die. In one example, this first circuit may be an integrated circuit which performs a particular function. For example, the first integrated circuit may comprise a general purpose processor, a microcontroller or a power management module. At step 402, a second circuit is formed on a second region of the die. This second circuit may be a safety circuit, configured to monitor the operation of the first circuit. At step 403 an isolation barrier is formed between the two regions thereby separating the first and second regions one from the other. The isolation barrier may be formed by known techniques. For example, the isolation barrier may comprise an oxide barrier in the form of a trench. Alternatively, the isolation barrier may comprise rings formed using a diffusion process. At step 405, electrical signal connections are formed across the isolation barrier by using a metallisation process, for example.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor die described herein can be any semiconductor material or combinations of materials, such as gallium arsenide, silicon germanium, silicon-on-insulator (SOI), silicon, monocrystalline silicon, the like, and combinations of the above.

Further, the integrated circuit comprising the main machine 101 of FIG. 1 may have any general functionality and may for example comprise a general-purpose processor, a microcontroller unit, an automotive engine management unit, an automotive transmission control unit, an automotive fuel injection control unit or any "system on chip" type device.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the supply loss detector module 210 of FIG. 2 may comprise its own driver circuitry within the same module. As another example, the input interface module 200 and output interface module 201 of FIG. 2 may be combined into a single module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An integrated circuit device, comprising:
   a first integrated circuit provided in a first region of a semiconductor die; and
   a safety circuit arranged to monitor the operation of the first integrated circuit and to output an error signal when a fault in said operation is detected,
   the safety circuit being provided in a second region of the semiconductor die separated from the first region by an isolation barrier provided in the semiconductor die, the isolation barrier inhibiting a transfer of perturbations from the first integrated circuit to the safety-circuit, the safety circuit comprises:
      at least one fault monitoring module, the at least one fault monitoring module comprises a built in self test module, and
      a built in self test checker module operably coupled to the built in self test module, wherein the built in self test module generates status flags, and wherein the built in self test checker module is arranged to verify the validity of the status flags by monitoring their logical states.

2. The integrated circuit device of claim 1, comprising an oscillator circuit module for providing a clock signal to the least one fault monitoring module.

3. The integrated circuit device of claim 1, wherein the safety circuit further includes a detector arranged to monitor a voltage being supplied to the safety circuit from an external source, and to generate a fault signal if the magnitude of the monitored voltage supply drops below a predetermined threshold value.

4. A safety critical system comprising the integrated circuit device of claim 1.

5. A method of manufacturing an integrated circuit device comprising:
   providing a semiconductor die,
   forming a first circuit on a first region of the die,
   forming a safety circuit on a second region of the die, arranged to monitor an operation of the first integrated circuit and to output an error signal when a fault in said operation is detected, on a second region of the die, forming a fault monitoring module including a built-in-self-test module on the second region, the built-in-self-test module arranged to generate status flags forming a built-in-self-checker module on the second region, the built-in-self-checker operably coupled to the built-in-self-test module, the built-in-self-checker module arranged to verify the validity of the status flags by monitoring logical states of the status flags, forming in the semiconductor die an isolation barrier separating the first region from the second region and inhibiting a transfer of perturbations from the first integrated circuit to the safety-circuit, and forming electrical signal connections across the isolation barrier, for enabling communication between the first circuit and the safety circuits.

6. The method of claim 5, wherein the isolation barrier comprises an oxide barrier in the form of a trench.

7. The method of claim 5, wherein the isolation barrier comprises rings formed using a diffusion process.

8. The method of claim 5 wherein the electrical signal connections are formed using a metallisation process.

9. The method of claim 5, further comprising:

forming an oscillator circuit module arranged to provide a clock signal to the least one fault monitoring module.

10. The method of claim 5, further comprising:

forming a detector on the second region, the detector arranged to monitor a voltage being supplied to the safety circuit from an external source, and to generate a fault signal if the magnitude of the monitored voltage supply drops below a predetermined threshold value.

11. The integrated circuit device of claim 1 comprising electrical signal connections for enabling communications between the first and second integrated circuits and being formed across the isolation barrier.

12. The integrated circuit device of claim 1, wherein the first integrated circuit is an electrical power management module.

13. The integrated circuit device of claim 1, wherein the isolation barrier comprises a trench composed of an oxide barrier.

14. The integrated circuit device of claim 1, wherein the isolation barrier comprises diffusions of dopants in the semiconductor die in the form of rings.

* * * * *